(12) United States Patent
Unseld et al.

(10) Patent No.: US 8,336,591 B2
(45) Date of Patent: Dec. 25, 2012

(54) PNEUMATIC TIRE WITH RUBBER COMPONENT CONTAINING CARBOXYMETHYLCELLULOSE

(75) Inventors: Klaus Unseld, Luxembourg (LU); Annette Lechtenboehmer, Ettelbruck (LU); Hans-Bernd Fuchs, Konz (DE); Claude Ernest Felix Boes, Erpeldange (LU); Ralf Mruk, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 361 days.

(21) Appl. No.: 12/620,877

(22) Filed: Nov. 18, 2009

(65) Prior Publication Data

US 2011/0114241 A1    May 19, 2011

(51) Int. Cl.
*B60C 9/00* (2006.01)
(52) U.S. Cl. ......... 152/450; 152/904; 152/905; 152/458
(58) Field of Classification Search ............... 524/35–42; 152/564, 450, 458, 904, 905
See application file for complete search history.

(56) References Cited

U.S. PATENT DOCUMENTS

| | | | | |
|---|---|---|---|---|
| 4,298,654 | A | * | 11/1981 | McCarty et al. ............... 428/407 |
| 4,375,497 | A | * | 3/1983 | Sandstrom ..................... 428/407 |
| 4,942,192 | A | * | 7/1990 | Yasuda et al. ................... 524/44 |
| 5,804,645 | A | * | 9/1998 | Matsuo ............................ 524/575 |
| 7,581,575 | B2 | * | 9/2009 | Corvasce et al. ............ 152/209.5 |
| 2004/0238090 | A1 | * | 12/2004 | Ueda et al. ..................... 152/204 |
| 2006/0151079 | A1 | * | 7/2006 | Weydert et al. ........... 152/209.18 |
| 2007/0074797 | A1 | * | 4/2007 | Corvasce et al. ........ 152/209.18 |
| 2010/0069530 | A1 | * | 3/2010 | Hidrot et al. ................... 523/157 |

FOREIGN PATENT DOCUMENTS

| | | |
|---|---|---|
| EP | 2168996 A2 | 3/2010 |
| JP | 03159803 A * | 7/1991 |
| WO | 2008/080751 A1 | 7/2008 |

OTHER PUBLICATIONS

English abstract of JP 03159803, 1991.*
English translation of Fukumoto et al., JP 03-159803, 2012.*
European Search Report, completed Mar. 16, 2011.

* cited by examiner

*Primary Examiner* — Robert D. Harlan
(74) *Attorney, Agent, or Firm* — John D. DeLong

(57) ABSTRACT

The present invention is directed to a pneumatic tire comprising at least one component, the at least one component comprising a rubber composition, the rubber composition comprising:

at least one diene based elastomer; and
a reinforcing amount of at least two fillers comprising carboxymethylcellulose and at least one of silica and carbon black.

10 Claims, No Drawings

PNEUMATIC TIRE WITH RUBBER COMPONENT CONTAINING CARBOXYMETHYLCELLULOSE

BACKGROUND

Carbon black and silica fillers are typically used as reinforcements in tire rubber compounds. While very effective reinforcement, carbon black and silica undesirably add weight to the tire. It is therefore desirable to obtain alternative reinforcements to partially or wholly replace carbon black and silica. Additionally, the use of renewable materials as reinforcement in rubber compounds in place of carbon black and silica is desirable from an environmental standpoint.

SUMMARY

The present invention is directed to a pneumatic tire comprising at least one component, the at least one component comprising a rubber composition, the rubber composition comprising:
at least one diene based elastomer;
a reinforcing amount of at least two fillers comprising carboxymethylcellulose and at least one of silica and carbon black.

DESCRIPTION

There is disclosed a pneumatic tire comprising at least one component, the at least one component comprising a rubber composition, the rubber composition comprising:
at least one diene based elastomer;
a reinforcing amount of at least two fillers comprising carboxymethylcellulose and at least one of silica and carbon black.

The rubber composition includes carboxymethylcellulose. A variable number of carboxymethyl groups are bound to some of the hydroxyl groups of the glucopyranose monomers that make up the cellulose backbone. In one embodiment, the number of carboxymethyl groups substituted amounts to 60 to 90 percent of the hydroxyl groups of the glucopyranose monomers that make up the cellulose backbone of the carboxymethylcellulose are substituted with carboxymethyl groups. The carboxymethyl groups may exist at the free acid ($—CH_2—COOH$) or salt (e.g., $—CH_2—COO^-Na^+$). In the salt form the carboxymethyl group may include any suitable metal counter ions including sodium, potassium, calcium, zinc, or magnesium salts, or organic counter ions including substituted ammonium or guanidinium ions. In one embodiment, the carboxymethyl group is in the form of the sodium salt ($—CH_2—COO^-Na^+$), as sodium carboxymethyl groups.

In one embodiment, the carboxymethylcellulose has a molecular weight ranging from 60,000 to 120,000. In one embodiment, the carboxymethylcellulose has a molecular weight ranging from 80,000 to 100,000.

Carboxymethylcellulose is present in the rubber composition in a reinforcing amount. By reinforcing amount, it is meant that the amount of carboxymethylcellulose is sufficient to result an increase tensile strength and modulus to the cured rubber composition, as compared to an otherwise identical rubber composition not including the carboxymethylcellulose.

In one embodiment, the rubber composition includes from 5 to 50 phr of carboxymethylcellulose. In one embodiment, the rubber composition includes from 15 to 40 phr of carboxymethylcellulose. In one embodiment, the rubber composition includes from 20 to 30 phr of carboxymethylcellulose.

The rubber composition also includes at least one of silica and carbon black.

The rubber composition includes at least one additional diene based rubber. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

In one embodiment, a synthetic or natural polyisoprene rubber may be used.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer."

In one embodiment, the carboxymethylcellulose is combined with the at least one diene based elastomer in a mixing procedure as follows. Carboxymethylcellulose may be added to water in a concentration ranging from 1 g of sodium hydroxymethylcellulose per 10 g of water to 1 g of sodium hydroxymethylcellulose per 1000 g of water. The resulting aqueous solution of sodium hydroxymethylcellulose is then mixed with a latex of the at least one diene based elastomer. The mixture is then dried resulting in the rubber composition of carboxymethylcellulose and elastomer. Alternatively, the mixture of aqueous carboxymethylcellulose and latex may be coagulated using a one percent solution of calcium chloride, followed by washing of the coagulated solids with water and drying to obtain the rubber composition of carboxymethylcellulose and elastomer.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 Parts, 2003, 62nd edition, published by the Institute of Petroleum, United Kingdom.

The rubber composition may include from about 10 to about 100 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 100 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

$$Z\text{-Alk-}S_n\text{-Alk-}Z \qquad \text{I}$$

in which Z is selected from the group consisting of

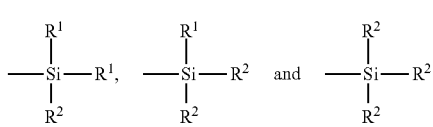

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

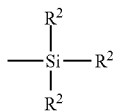

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr.

Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, preparation and testing of rubber compositions containing varying amounts of sodium carboxymethylcellulose is illustrated.

To prepared each sample, an aqueous solution of sodium carboxymethylcellulose (MW=90,000) was prepared at a concentration of 1 g sodium carboxymethylcellulose per 30 g of deionized water. The sodium carboxymethylcellulose solution was then mixed with a styrene-butadiene rubber latex containing 21.5 percent by weight solids. The proportion of sodium carboxymethylcellulose solution to rubber latex varied depending on the desired final sodium carboxymethylcellulose content of the resulting rubber composition. The mixture of latex and sodium carboxymethylcellulose was dried in an oven at 70° C.

The dried solids of SBR and sodium carboxymethylcellulose were mixed in a laboratory mixer with a curative system including 1.4 phr of sulfur, 1.4 phr of cyclohexyl-2-benzothiazole sulfonamide, 1.7 phr of diphenylguanidine, 3 phr of zinc oxide, and 2 phr of stearic acid. Samples (for viscoelastic and stress-strain measurements) were cured for ten minutes at 170° C. and tested for physical properties as shown in Table 1. Viscoelastic properties were measured using an Eplexor® dynamic mechanical analyzer at 10 Hz and 2% DSA. Stress-strain properties were measured using an Automated Testing System instrument by the Instron Corporation. Such instrument may determine ultimate tensile, ultimate elongation, modulii, etc. Data reported in the Table is generated by running the ring tensile test station which is an Instron 4201 load frame. Cure properties were determined using a Monsanto oscillating disc rheometer (MDR) which was operated at a temperature of 150° C. and at a frequency of 11 hertz. A description of oscillating disc rheometers can be found in The Vanderbilt Rubber Handbook edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of The Vanderbilt Rubber Handbook.

TABLE 1

| | Sample No. | | | | |
|---|---|---|---|---|---|
| | 1 | 2 | 3 | 4 | 5 |
| Viscoelastic Properties Measured at 20° C. | | | | | |
| Sodium Carboxymethylcellulose, phr | 0 | 5 | 10 | 15 | 20 |
| Tan delta | 0.096 | 0.12 | 0.123 | 0.125 | 0.129 |
| Viscoelastic Modulus E*, MPa | 2.7 | 3.2 | 3.8 | 4.5 | 5.4 |
| Storage Modulus E1, MPa | 2.7 | 3.1 | 3.8 | 4.4 | 5.4 |
| Loss Modulus E2, MPa | 0.3 | 0.4 | 0.5 | 0.6 | 0.7 |
| Loss Compliance J2, 1/(1000 MPa) | 36 | 37.8 | 31.9 | 27.7 | 23.6 |
| Delta E* | 0 | 0 | 0.1 | 0.1 | 0.1 |
| Viscoelastic Properties Measured at 70° C. | | | | | |
| Tan delta | 0.083 | 0.07 | 0.082 | 0.088 | 0.098 |
| Viscoelastic Modulus E*, MPa | 2.2 | 2.9 | 3.3 | 3.8 | 4.3 |
| Storage Modulus E1, MPa | 2.2 | 2.9 | 3.3 | 3.8 | 4.3 |
| Loss Modulus E2, MPa | 0.2 | 0.2 | 0.3 | 0.2 | 0.5 |
| Loss Compliance J2, $10^{-3}$/MPa | 37.3 | 24.2 | 24.9 | 23.3 | 22.6 |
| Delta E* | 0 | 0 | 0 | 0.1 | 0.1 |
| Stress-Strain Measured at Room Temperature | | | | | |
| Tensile Strength, MPa | 5.7 | 8.9 | 11.1 | 10.9 | 10.1 |
| Elongation at Break, % | 460 | 494 | 541 | 553 | 518 |
| 100% Modulus, MPa | 1.1 | 1.4 | 1.7 | 1.8 | 2.1 |
| 150% Modulus, MPa | 1.5 | 2.0 | 2.4 | 2.5 | 2.9 |
| 200% Modulus, MPa | 1.9 | 2.8 | 3.2 | 3.2 | 3.7 |
| 300% Modulus, MPa | 3.0 | 4.4 | 4.9 | 4.8 | 5.3 |
| Breaking energy/volume, mJ/mm$^3$ | 11.8 | 19.4 | 26.1 | 26.5 | 25 |
| Rheometer Properties Measured at 150° C. | | | | | |
| Minimum Torque, dNm | 1.0 | 1.4 | 1.6 | 1.7 | 1.9 |
| Maximum Torque, dNm | 6.8 | 7.8 | 8.4 | 8.9 | 8.9 |
| Delta Torque, dNm | 5.7 | 6.4 | 6.8 | 7.2 | 7.1 |
| T10, minutes | 1.4 | 1.4 | 1.3 | 1.4 | 1.4 |
| T25, minutes | 1.7 | 1.8 | 1.7 | 1.8 | 1.8 |
| T30, minutes | 1.7 | 1.8 | 1.7 | 1.8 | 1.8 |
| T50, minutes | 2.3 | 2.2 | 2.0 | 2.1 | 2.2 |
| T90, minutes | 22.3 | 13.6 | 9.0 | 5.6 | 8.2 |

As seen by the data of Table 1, addition of sodium carboxymethylcellulose results in reinforcement of the rubber compound. In particular, tensile strength and modulus are seen to increase significantly for Samples 2 through 5, as compared with control Sample 1 containing no sodium carboxymethylcellulose.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a pneumatic tire, comprising the steps of:
adding carboxymethylcellulose to water in a concentration ranging from 1 g of carboxymethylcellulose per 10 g of water to 1 g of carboxymethylcellulose per 1000 g of water to make an aqueous solution of carboxymethylcellulose;
mixing the aqueous solution of carboxymethylcellulose with a latex of the at least one diene based elastomer to make a first mixture;
coagulating the first mixture using a one percent solution of calcium chloride;
washing of the coagulated solids with water;
drying the coagulated solids to make a composite of carboxymethylcellulose and elastomer,
mixing the composite of carboxymethylcellulose with at least one of silica and carbon black to make a rubber composition comprising a reinforcing amount of at least two fillers, the two fillers comprising the carboxymethylcellulose and the at least one of silica and carbon black; and
fabricating a tire comprising at least one component, the at least one component comprising the rubber composition.

2. The method of claim 1, wherein the at least two fillers comprises from 5 to 50 phr of carboxymethylcellulose and from 10 to 100 phr of at least one of silica and carbon black.

3. The method of claim 1, wherein the at least two fillers comprises from 15 to 40 phr of carboxymethylcellulose.

4. The method of claim 1, wherein the at least two fillers comprises from 20 to 30 phr of carboxymethylcellulose.

5. The method of claim 1, wherein the carboxymethylcellulose comprises sodium carboxymethylcellulose.

6. The method of claim 1, wherein the carboxymethylcellulose comprises carboxymethyl groups substituted at 60 to 90 percent of the hydroxyl groups of the glucopyranose monomers that make up the cellulose backbone of the carboxymethylcellulose.

7. The method of claim 1, wherein the carboxymethylcellulose has a molecular weight ranging from 60,000 to 120,000.

8. The method of claim 1, wherein the carboxymethylcellulose comprises carboxymethyl groups existing as a free acid form or salt.

9. The method of claim 1, wherein the carboxymethylcellulose comprises carboxymethyl groups existing as a salt with counter ions selected from the group consisting of metal ions and organic ions.

10. The method of claim 1, wherein the carboxymethylcellulose comprises carboxymethyl groups existing as a salt with counter ions selected from the group consisting of sodium ions, potassium ions, calcium ions, zinc ions, or magnesium ions, substituted ammonium ions, and guanidinium ions.

* * * * *